United States Patent [19]
Hiatt et al.

[11] 3,788,268
[45] Jan. 29, 1974

[54] TRAFFIC WARNING SIGNAL FOR USE ON VEHICLES

[76] Inventors: Frank S. Hiatt; Milton Freewater, P.O. Box 436, both of Portland, Oreg. 97862

[22] Filed: Nov. 29, 1972

[21] Appl. No.: 310,603

[52] U.S. Cl. ............. 116/28 R, 116/63 P, 280/150, 293/21
[51] Int. Cl. ..................................................... B60q
[58] Field of Search ............. 116/28, 63, 63 P, 114; 240/8.2; 293/21, 24; 180/82, 83; 340/84, 87, 340/102, 115; 280/150 P, 150 R; 40/129 C, 125; 248/298, 309

[56] References Cited
UNITED STATES PATENTS

| | | | |
|---|---|---|---|
| 1,864,637 | 6/1932 | Byrne | 280/150 R |
| 2,060,771 | 11/1936 | Kempf | 116/28 R |
| 2,116,604 | 5/1938 | Karl | 293/24 |
| 2,646,638 | 7/1953 | Peterson | 40/125 |
| 2,942,571 | 6/1960 | White | 116/63 P |
| 3,633,161 | 1/1972 | Price | 340/81 |
| 3,675,785 | 7/1972 | Martin | 280/150 R |

*Primary Examiner*—Louis J. Capozi
*Attorney, Agent, or Firm*—Eugene D. Farley

[57] ABSTRACT

A traffic warning signal for use on vehicles, particularly highway service trucks, comprises a bracket support attachable to the vehicle, a bracket, a pivotal mounting means mounting the inner end of the bracket on the bracket support for free swinging movement of the bracket between extended and retracted positions. Detent means releasably lock the bracket in the retracted position. A triangular signal support is attached vertically to the outer end of the bracket for mounting a brightly colored, traffic signal.

3 Claims, 4 Drawing Figures

PATENTED JAN 29 1974 3,788,268

TRAFFIC WARNING SIGNAL FOR USE ON VEHICLES

This invention relates to a traffic warning signal for use on vehicles. It pertains particularly to a signal including a brightly colored traffic signal cone to be mounted on telephone and utility service trucks or other highway servicing equipment.

As is well known, it is frequently necessary for the truck and service vehicles used in highway and utility construction and maintenance, to operate and park along the margins of busy highways and streets. This exposes the vehicle and crew to serious hazard of accidents.

It is conventional practice to surround the vehicle with safety signals of various types, and in particular with safety signal cones of brightly colored fluorescent material. In some instances the cones are mounted directly on the vehicle.

The application of the signal cones in this hazardous environment is subject to serious limitations.

In some instances it is necessary to place the signal cones on the ground, where they are not clearly visible. If mounted on the vehicle in an extended position, the mounting mechanism is subject to breakage in the event that the signals are struck by passing traffic. The mounting mechanisms are not easily shifted between advanced operative positions and retracted storage positions, nor can they be locked in their storage positions. It is difficult to detachably mount them on the vehicle.

It accordingly is the general purpose of the present invention to provide a vehicle-mounted traffic warning signal which is clearly visible from all directions; which is easily mounted on the vehicle; which is readily shiftable between advanced and retracted positions; which is releasably but securely locked in place when in the retracted inoperative position; which is readily shiftable to vary the location of the signal to meet the needs of various situations; which need not be removed from the vehicle when the vehicle is traveling from place to place; and which is readily adapted for use with vehicles of various categories and safety signal cones of the conventional, readily available type.

The foregoing and other objects of the present invention are accomplished by the provision of a traffic warning signal which, broadly considered, comprises a bracket support adapted to be attached to a structural member of the vehicle. The inner end of a bracket is pivotally mounted on the bracket support so that it swings freely between advanced and retracted positions.

A triangular signal support is attached in a vertical position on the outer end of the bracket. It is dimensioned and contoured frictionally to engage a brightly colored traffic signal.

Means are provided for adjusting the length of the bracket, and also for releasably locking it in its retracted position. Accordingly, a vehicle provided with one or more of the signals may be driven to the selected location, parked, the bracket arm extended, and the traffic signal slipped over the support. This renders the vehicle highly visible to all passers-by. The bracket with signal mounted thereon remains in its extended position until shifted manually to its retracted position upon moving the vehicle to another location. In the event the signal or bracket is struck by a passing vehicle, it swings freely to its retracted position where it locks automatically, preventing damage to either the signal or the vehicle.

Considering the foregoing in greater detail and with particular reference to the drawings.

Figure 1:
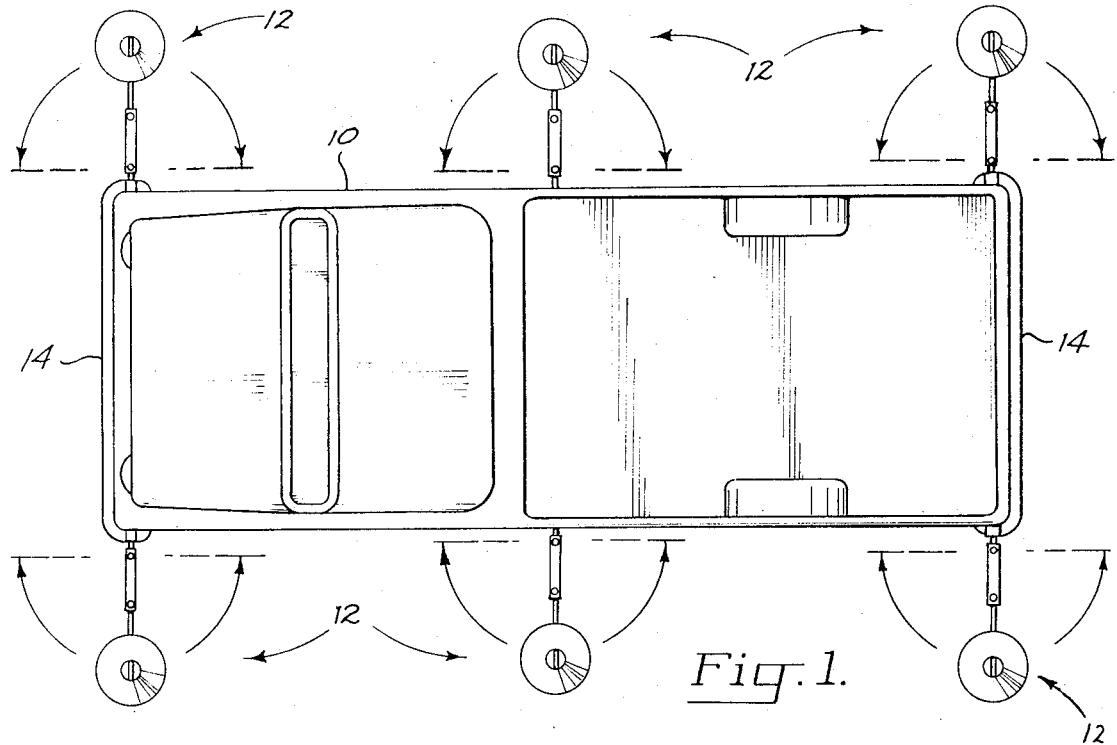
FIG. 1 is a schematic plan view of a highway or utility servicing vehicle illustrating the manner of locating the hereindescribed traffic warning signal thereon.
Figure 2:
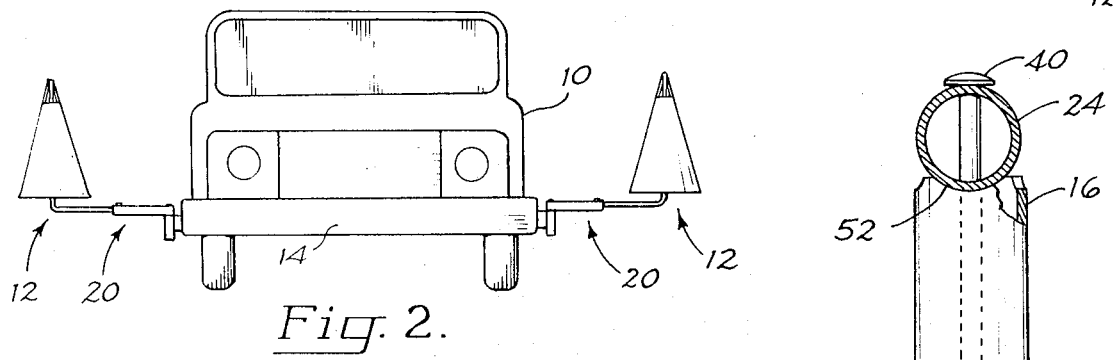
FIG. 2 is a front elevation of the vehicle with the warning signal in its operative positions.

FIG. 1 illustrates a vehicle 10 having a plurality of the hereindescribed traffic warning signals, indicated generally at 12, mounted thereon. In the illustrated application of the invention, there are six of the signals, three on each side, located on the forward and rearward bumpers as well as centrally. When located in this manner, above bumper height and completely surrounding the vehicle, the vehicle is rendered highly visible from all directions even to a rapidly approaching automobile.

It is a feature of the invention that the support member by means of which each signal is attached to the vehicle may be attached permanently and inconspicuously in a location where it does not interfere with the normal use of the vehicle. The side segments of the front and rear bumpers 14 provide ideal locations.

Figure 3:
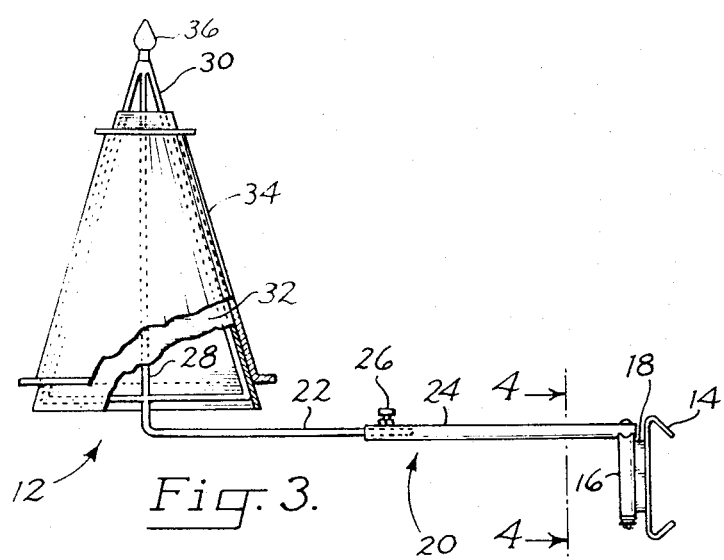
FIG. 3 is a view in side elevation of the signal, parts being broken away to show interior construction.

Thus, as shown in FIG. 3, a bracket support comprising a sleeve 16 having an attaching web 18 is welded to bumper 14 with the sleeve in a vertical position.

Sleeve 16 is designed to support a bracket indicated generally at 20 and preferably formed in three segments.

The central segment comprises two telescoping sections 22, 24. These may be releasably engaged in any selected position of extension by means of a thumb screw 26.

In the normal application of the signal, the central segment of the bracket extends outwardly and horizontally. At its outer end it mounts a vertical terminal segment 28. This may comprise a length of rod to which is welded a triangular signal support 30.

The signal support is dimensioned and contoured to receive a flat plastic envelope or sleeve 32 in a snug, friction fit. This per se may constitute the signal. However, if desired, a conventional highway safety cone 34 of brightly colored fluorescent plastic may be nested over the plastic sleeve. Optionally, a flashing signal light 36 may be attached to the top of the triangular support and connected through a suitable circuit to the battery of the vehicle.

Means are provided at the inner end of the bracket 20 for mounting it for free swinging movement on support sleeve 16.

Figure 4:
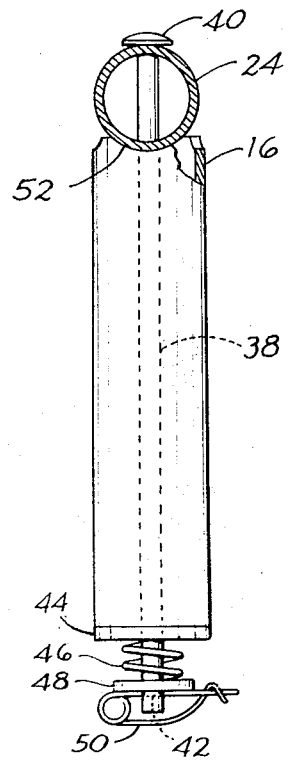
FIG. 4 is an enlarged detail sectional view taken along line 4—4 of FIG. 3.

As shown particularly in FIG. 4, the means employed for this purpose comprises a vertical rod 38 having a head 40 at its upper end and a transverse perforation 42 at its lower end.

Rod 38 penetrates an appropriately placed transverse opening through section 24 of the bracket. It thereupon passes completely through sleeve 16 and out the lower end of the latter. It mounts a washer 44 which bears against the lower end of the sleeve. It also mounts a compression spring 46 between washer 44 and a companion washer 48. A suitable fastener such as pin 50 extends through opening 42 in the lower end of rod 38 and holds the assembly releasably together.

Detent means releasably lock the bracket in its retracted position wherein it lies parallel to the sides of the vehicle.

The means employed for this purpose, FIG. 4, comprise two pairs of recesses 52 which lie opposite each other in the top surface of sleeve 16. The recesses are aligned in planes parallel and perpendicular, respectively, to the side of the vehicle. They have sloping, shallow, camming surfaces having a radius cooperative with the arc of bracket section 24 which they receive.

In the operation of the signal, the vehicle is driven to the desired location with brackets 20 retracted. The brackets then are extended and one or the other of signals 32, 34 slipped over them. Signal lights 36 are illuminated, if desired.

The signals are maintained in their elevated, extended position wherein they render the vehicle clearly visible. In the event they are struck by a passing vehicle, or when it is desired to inactivate them, the arms swing or are swung freely through an arc of 90° until bracket section 24 seats in recesses 52. This releasably locks the brackets in their inoperative position pending another use. Signals 32, 34 are removed from their supports and stored on the vehicle, which then may be moved to its next location.

Having thus described my invention in preferred embodiments, I claim:

1. For use on vehicles, a traffic warning signal comprising:
    a. a bracket support comprising a vertical sleeve adapted to be attached to a structural member of a vehicle,
    b. a bracket comprising a horizontally disposed elongated member having an inner end portion provided with a transverse opening therethrough and an elongated rod extending through the transverse opening and freely through the vertical sleeve, with the inner end portion of the elongated member overlying the sleeve, said overlying portion having an arcuate cross-section,
    c. the upper end of the sleeve having perpendicularly disposed pairs of arcuate recesses dimensioned to receive the arcuate portion of the inner end of the elongated member retractably in one pair thereof when the elongated member is in operative position extended from the vehicle and in the other pair thereof when the elongated member is in retracted position adjacent the vehicle,
    d. spring biasing means interengaging the sleeve and rod for biasing the inner end of the elongated member resiliently toward the recesses, whereby a predetermined force applied horizontally to the elongated member effects retraction of the inner end thereof from a pair of the recesses and consequent swinging of the elongated member in a horizontal plane, and
    e. a traffic signal mounted on the outer end of the elongated member.

2. The traffic warning signal of claim 1 including a triangular signal support attached in a vertical position on the outer end of the elongated member, and wherein the traffic signal comprises a flat, plastic sleeve overlying and removably engaging the triangular signal support.

3. The traffic warning signal of claim 2 including a hollow, conical traffic signal dimensioned to overlie and frictionally engage the sleeve.

* * * * *